United States Patent [19]

Hume

[11] Patent Number: 5,094,028
[45] Date of Patent: Mar. 10, 1992

[54] TERMITE BLOCKING SYSTEM

[76] Inventor: Derrill L. Hume, 1313 E. Coolidge St., Phoenix, Ariz. 85014

[21] Appl. No.: 538,266

[22] Filed: Jun. 14, 1990

Related U.S. Application Data

[63] Continuation-in-part of Ser. No. 305,435, Feb. 1, 1989.

[51] Int. Cl.⁵ ............................................... A01M 1/20
[52] U.S. Cl. ..................................... 43/132.1; 43/121; 43/124
[58] Field of Search ...................... 43/107, 131, 132.1, 43/129, 125, 60, 61, 69, 121, 124; 424/153, DIG. 11

[56] References Cited

U.S. PATENT DOCUMENTS

| | | | |
|---|---|---|---|
| 68,867 | 9/1867 | Galbraith | 424/153 |
| 395,065 | 10/1888 | Langseth | 424/153 |

Primary Examiner—Kurt Rowan
Attorney, Agent, or Firm—James F. Duffy

[57] ABSTRACT

A termite blocking system which introduces a non-toxic, termite repelling, hygroscopic material, such as salt, into the pathway of subterranean termites. By ingesting the salt and coming into contact with the salt laden soil, the termites are repelled. If the termites persist in advancing through the treated soil, they will die of dehydration. The use of such materials provides a non-polluting barrier for inhibiting the advance of subterranean termites into a structure.

8 Claims, 1 Drawing Sheet

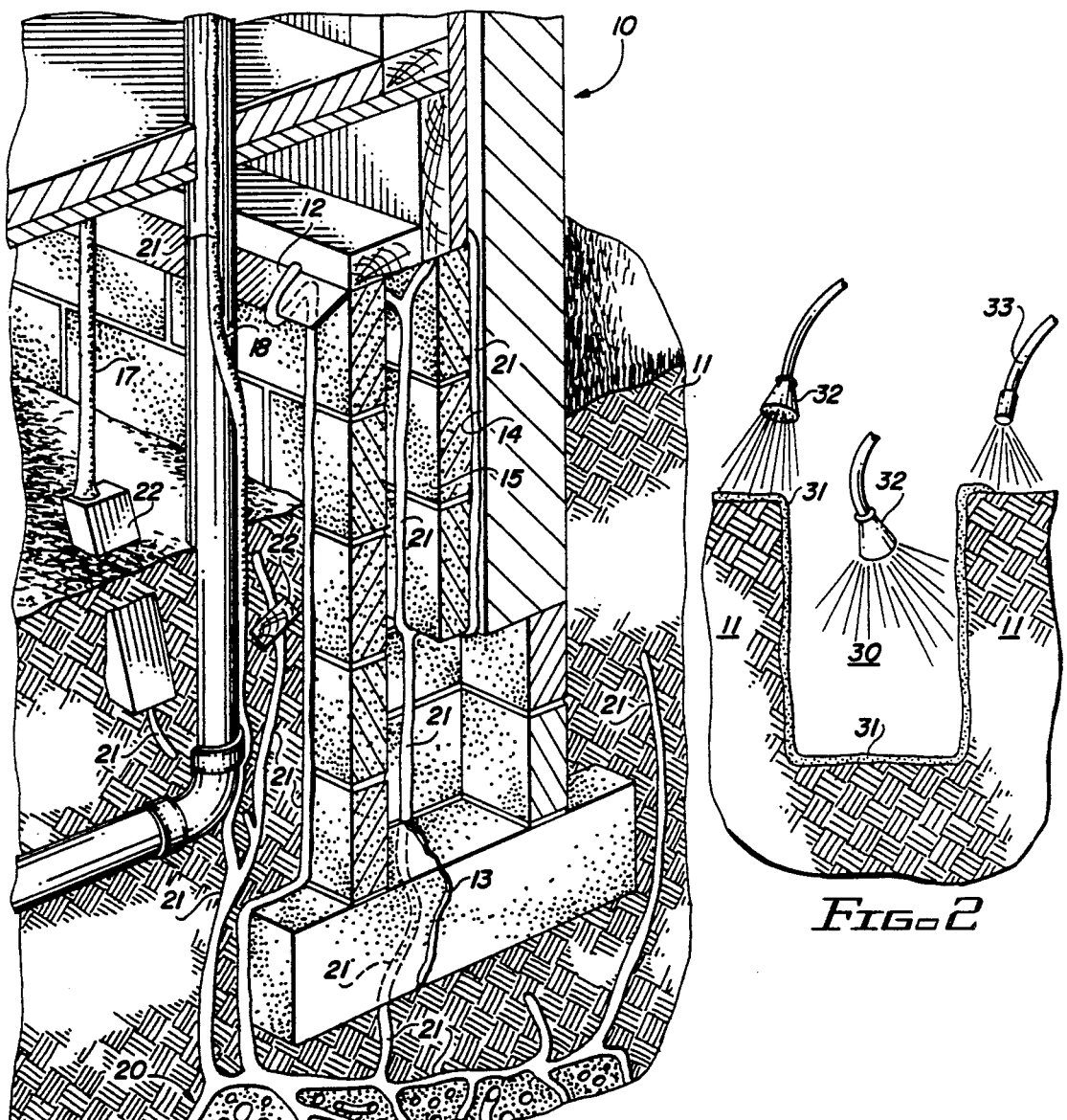
FIG-1
FIG-2
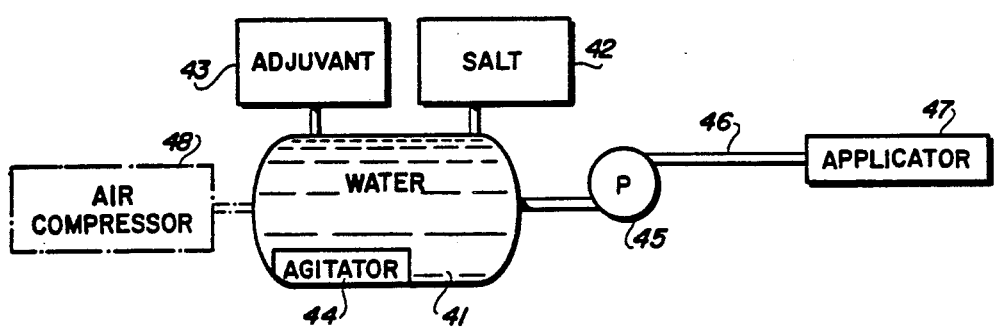
FIG-3

TERMITE BLOCKING SYSTEM

This application is a continuation-in-part of application Ser. No. 07/305,435, filed 02/01/89.

BACKGROUND

1. Field of the Invention

The invention relates to the field of termite damage prevention. In particular, the invention relates to a non-polluting system for blocking the passage of termites into structures susceptible to damage by these pests.

2. Prior Art

As a highly specialized insect society, subterranean termites are worthy of study. As house guests, however, they are unwanted and uninvited. Because termites can invade a residence and do serious damage before their presence is determined, home owners throughout the United States expend significant amounts of money to discover invasions, repair damages and inhibit future invasions. It is estimated that the economic impact of termites, including the cost of their control, exceeded $1.17 billion in 1982. This represents a per capita cost of $5.16.

One has only to look at the label of a termiticide to determine how hazardous such materials are to humans and the environment in general. Termiticides may be fatal if swallowed. Excessive absorption through skin may be fatal, and may cause substantial although temporary eye injury. Many are toxic to birds and wildlife, extremely toxic to fish and aquatic organisms. Runoff can contaminate water supplies. Unlike the innovations in the computer arts, termiticides are not "user friendly." It is an object of the invention to provide a method for blocking the advance of subterranean termites into a residential structure or the like in a manner which will not prove toxic to persons or the environment.

SUMMARY OF THE INVENTION

The invention is disclosed as a termite blocking system for inhibiting the advance of termites through the earth. The system includes termite repelling hygroscopic material, and means for distributing the hygroscopic material in regions anticipated to be traveled by termites.

In a first embodiment the means for distributing the material distributes material in particle form, and the material is sodium chloride.

In a second preferred embodiment the means for distributing the material distributes it in fluid form: a sodium chloride solution. Optionally, a soil adjuvant is also distributed to improved the rate at which the material will be absorbed into soil on which it and the soil adjuvant are distributed.

Other elements of the invention are disclosed as a source of water coupled to the distributing means which, itself, further comprises means for mixing sodium chloride with the water to provide a solution in which sodium chloride is the solute and water is the solvent. There are means for spraying the solution, and a soil adjuvant is mixed with the solution in the distributing means for spraying the soil adjuvant with the solution.

DESCRIPTION OF THE DRAWINGS

FIG. 1 is a cross-sectional view of the foundation of a building and the soil in which it sits. The various invasive paths of termites are indicated.

FIG. 2 illustrates the application of the termite blocking agent of the invention as well as application of conventional termiticides.

FIG. 3 represents a functional block diagram of the elements comprising a system for the application of the termite blocking agent of the invention.

A DETAILED DESCRIPTION OF THE INVENTION

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

The foundation of a building 10 is illustrated in cross-sectional view in FIG. 1. Within the earth 11 and underlying foundation 10 is a termite colony 20. The termites from colony 20 travel through the soil by means of tunnels 21 constructed by the termites who literally ingest the soil as they passage through it. Once out of the soil 11, the termites extend their tunnels by forming mud of earth and saliva. Thus the termite tunnels 21 can be found in the hollow spaces 14 between veneer walls, in voids 15 in the foundation, and through cracks 13 in joints in the concrete.

Termites are attracted to construction debris 22 and will even form free-standing mud tunnels 17 to continue their passage upward into the structure. Termites readily adhere tunnels 21 to structures such as pipes 18 passing between earth 11 in the structure 10 and around termite shields 12.

The presence of the mud wall tunnels 21 is certain evidence that a termite infestation has begun. All too often, however, the presence of such tunnels is not readily obvious. Only when the mud tunnel progresses along an exterior wall are they readily discernible.

The fact that termites are in intimate contact with the earth, that they ingest soil in their passage through it, that they manipulate soil and moisten it with their saliva in constructing above-ground tunnels, leads to the innovative termite blocking system now to be described.

Sodium and chloride are each deadly elements. However, when these elements form common table salt, sodium chloride, the mineral is generally not deemed to be toxic. While it is known that salt has been used in pesticides as an action retarding agent or to increase the solubility of one of the essentials of the pesticide, no references have been found which indicate that salt per se is toxic to insect pests. Nothing in this disclosure is intended to imply that sodium chloride is to be considered anything but non-toxic. For purposes of this disclosure, salt, sodium chloride, is deemed to be both termite repelling and hygroscopic. Hygroscopic materials have the ability to absorb moisture from the air. That definition is broadened herein to any material which has the ability to draw off moisture as it comes in contact with or passes through a moisture-laden body. By this definition salt is hygroscopic since in passing through the body of a termite, or in coming in contact with a termite's body it tends to draw off moisture from the termite's body. If enough moisture is drawn off, the termite will tend to become desiccated, and die. In this disclosure, salt is used as the hygroscopic material utilized in the termite blocking system. The use of salt is by way of exposition and not of limitation. Any other material being herein defined as hygroscopic, which tends to draw off moisture from the body of the termite, causing the termite to suffer from dehydration, is deemed to fall within the claimed limitations of this invention.

In FIG. 2 is illustrated, in cross-sectional detail, footing excavation 30 in the earth 11. A salt water solution is being sprayed by spray heads 32 to soak the soil forming the boundaries of excavation 30 as well as those portions of the earth which will underlie the structure to be built upon the footings placed within excavation 30. To condition the soil 11 to accept the salt water solution being sprayed by spray heads 32, a soil adjuvant is added to the salt water solution. Soil adjuvants are well known to those skilled in the agricultural arts. Adjuvants, sometimes referred to as wetting agents, so condition the soil that water and liquid fertilizers, which might otherwise lie in puddles upon the surface of the soil, will readily penetrate deep within the soil. The purposes of this disclosure, the soil adjuvant permits the salt water solution to readily penetrate into the depths of the soil 11.

A layer of raw salt 31 is applied to the surface of the earth 11 and along the perimeter of excavation 30. The salt may be spread as a dry particulate, in its crystalline form, to generally horizontal ground surfaces. A moistened slurry of salt may be hosed to troweled onto near vertical surfaces.

When foundation 10, in the form of a footing or grade level floor, is laid in intimate contact with earth 11 to which salt spray 32, or salt layer 31, has been applied, a weather protective environment is created which prevents dilution of the salt/earth mixture. This statement applies, to only a slightly lesser degree, to salt treated earth closed over by a raised-floor foundation.

If subterranean termites tunnel through the earth and approach a structure built on soil which has been treated in the aforesaid manner, the termites will ingest salt as they ingest the soil in tunneling through the earth 11.

In general, the termites are repelled by the ingestion of salt. Indeed, recent experimentation indicates that termites are repelled by the mere contact with salt in the earth; and that ingestion of the salt laden earth is not necessary to effectively repel the termites.

Although salt-contact-repulsion appears to define the primary workings of the termite blocking system here described, what is now seen to be a secondary function of the salt laced earth becomes effective against termites which continue to ingest the earth. As the salty earth mixture passes through the termite body moisture will be drawn off as well. So too, in burrowing through the salt-laden earth, moisture will be drawn from the termite's body as it contacts the salt within the earth. The termite will become dehydrated as it moves through the treated area. The final barrier of raw salt will be particularly destructive to the termite. It is anticipated that the salt-laden soil will act as a barrier which will discourage the advance of the termites and which will result in the death of those termites which persist in advancing into the salt-laden barrier.

In preparing the earth, as indicated in FIG. 2, it is anticipated that the soil 11, which will be exterior of any structure erected on the footing within excavation 30, will also be treated by spraying with the salt water/adjuvant solution. The salt laden earth which is covered by or in intimate contact with concrete footings or ground level concrete floors (all deemed to fall within the purview of foundation reference 10) will be protected from rain and other applications of water and no dilution of the salt content of the underlying earth is anticipated over the lifetime of the building. Indeed, the protection offered by an overlaying foundation cap above the salt laden earth virtually assures that the termite blocking system here taught will remain effective indefinitely and thus preclude the need to have a building "termite-proofed" at regular intervals. However, the effects of rainfall and water applied to exterior plantings is unknown. It is anticipated that such natural and man-made applications of water may tend to carry the salt away and degrade the effectiveness of the salt barrier. For these reasons it is anticipated that normal termite control procedures may be followed at the periphery of the building using termiticide applicators 33 to apply the toxic liquids. However, the application of the salt-laden barrier to the earth which will underly any structure and to the soil adjacent to the footing of that structure will inhibit the hidden invasion by such destructive pests as subterranean termites. It will be standard procedure that upon completion of the footing and emplacement of the earth backfill, the salt water/adjuvant solution will be applied liberally to the backfill so as not to leave an untreated passageway for the advance of termites.

FIG. 3 is a functional block diagram of a termite blocking system. A water source, or container 41, has coupled thereto a source of salt 42 and a source of soil adjuvant 43. Salt 42 and water 41 may be mixed together by means of agitator 40 to form a thick semi-fluid slurry which will be pumped by pump 45 through hoses 46 to be applied into the surface of the soil to form a surface barrier of salt by applicator 47, which, in this application, may be a hose nozzle. Alternatively, for deep soil penetration, water 41 and adjuvant are mixed in the prescribed amounts as set forth by the manufacturer of the adjuvant. Salt 42 is then added to the mixture. It is presently preferred that a saturated salt water solution be prepared which is then pumped by pump 45 through holes 46 to applicator 47, which in this instance may be a spray nozzle, and applied to the soil where, with the aid of the adjuvant, the salt solution rapidly penetrates the soil. As an alternative to pump 45, air compressor 48 may be provided to pressurize the water source 41 so as to force the salt water solution or salt slurry from water source 41 through hose 46 to applicator 47. This arrangement may be preferred in that no salt solutions or slurries are brought into contact with the moving parts of a pump such as 45.

What has been disclosed is a termite blocking system which introduces a non-toxic, termite repelling, hygroscopic material, such as salt, into the pathway of subterranean termites. By ingesting the salt and coming into contact with the salt laden soil, the termites are repelled. If the termites persist in advancing through the treated soil, they will die of dehydration. The use of such materials provides a non-polluting barrier for inhibiting the advance of termites into a source.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such a clear and concise manner that those skilled in the art may readily understand and practice the invention, that which is claimed is:

1. In the method for treatment of building sites prior to the erection of a building on a treated site comprising the steps of applying a toxic termiticide to the earth on which a building is to be emplaced, and erecting a building on a foundation placed on the earth treated with the toxic termiticide, the improvement eliminating the toxicities from a treating site comprising the steps of:

eliminatent the application of a toxic termitecide to the earth;
  substituting salt as a non-toxic, termite repellent for said toxic temiticide;
  preparing a salt water solution for application to the earth at said building site;
  soaking the soil forming the boundaries of said building site for the erection of said building as well as those portions of the earth which will underlie the structure of said building to be build upon footings placed within said boundaries.

2. The improved method of claim 1 comprising the further step of selecting sodium chloride as said non-toxic, termite repellent salt.

3. The improved method of claim 1 comprising the further step of treating said building site by applying said salt solution to said building site upon completion of the building footings and emplacement, making liberal application of said salt solution about said site for purposes of eliminating any untreated passageways through which termites might advances.

4. The improved method of claim 3 comprising the further step of preparing a saturated salt solution prior to applying said salt solution to said earth.

5. The improved method of claim 4 comprising the further step of preparing a salt slurry solution and applying said salt slurry to said earth along any steep embankments of earth from which said salt solution may tend to run.

6. The improved method of claim 3 comprising the further step of adding a wetting agent to said salt solution to increase the ease of penetration of said solution into said earth.

7. The improved method of claim 1 further comprising the steps of:

applying said salt solution to the earth at said building site prior to the erection of the foundation of said thereon;
  erecting the foundation of said building on the earth to which said salt was applied; and,
  reapplying said salt solution to the earth on said site used in backfilling said foundation.

8. The improved method of claim 7 wherein the step of erecting the foundation of said building further comprises the step of pouring said foundation of concrete emplaced in intimate contact with said earth to which said salt solution has been applied, whereby the footings and grade level floors of said foundation provide a cap over said earth to prevent the dilution therefrom of said termite repelling salt from said earth.

* * * * *

UNITED STATES PATENT AND TRADEMARK OFFICE
CERTIFICATE OF CORRECTION

PATENT NO. : 5,094,028
DATED : March 10, 1992
INVENTOR(S) : Derrill L. Hume

It is certified that error appears in the above-indentified patent and that said Letters Patent is hereby corrected as shown below:

Column 1, line 56, "improved" should read -- improve --.

Column 5, line 16, "eliminatent" should read -- eliminating --.

Signed and Sealed this

Eleventh Day of January, 1994

Attest:

BRUCE LEHMAN

*Attesting Officer*      *Commissioner of Patents and Trademarks*